G. F. FRALEY.
PHOTOGRAPHIC APPLIANCE.
APPLICATION FILED SEPT. 12, 1908.
931,050.
Patented Aug. 17, 1909.
Fig. 1.
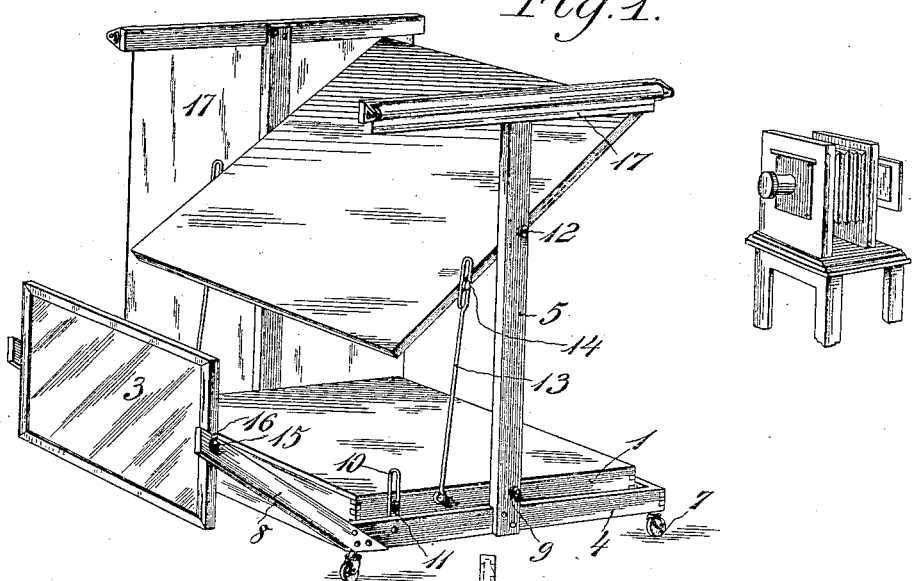
Fig. 4.
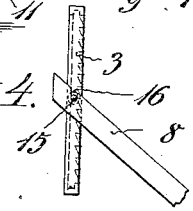
Fig. 2.
Fig. 3.
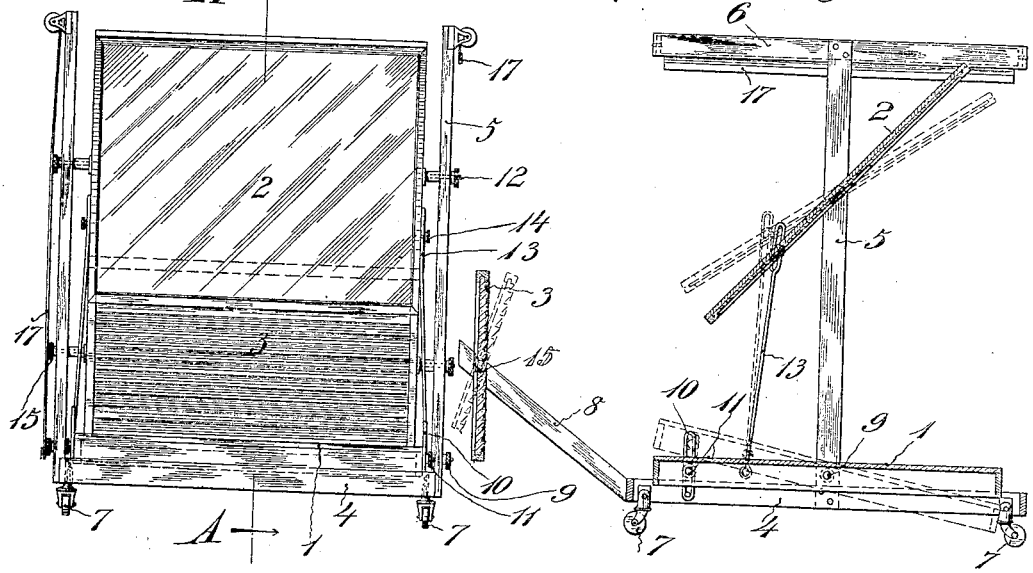
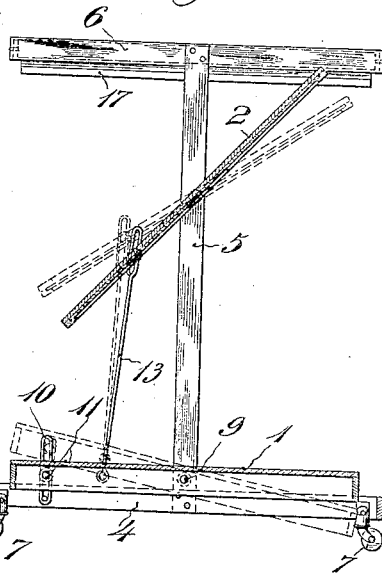
Witnesses:
Inventor:

UNITED STATES PATENT OFFICE.

GASSNER F. FRALEY, OF NEW YORK, N. Y.

PHOTOGRAPHIC APPLIANCE.

No. 931,050.  Specification of Letters Patent.  Patented Aug. 17, 1909.

Application filed September 12, 1908. Serial No. 452,710.

*To all whom it may concern:*

Be it known that I, GASSNER F. FRALEY, a citizen of the United States, and resident of the borough of Manhattan, in the city and State of New York, have invented a new and useful Photographic Appliance, of which the following is a specification.

The object of my invention is to provide a photographic appliance which comprises a device, the parts of which are so constructed and arranged that objects of various shapes and sizes may be presented in the proper relationship to one another and in the same focal plane so that the photographs thereof will not be distorted and in which the light thrown upon the said articles may be adjusted to produce the best effects.

A practical embodiment of my invention is represented in the accompanying drawings, in which—

Figure 1 represents the appliance in perspective, a photographic camera being represented in connection therewith, Fig. 2 is a front view of the appliance, Fig. 3 is a vertical section taken in the plane of the line A—A of Fig. 2, looking in the direction of the arrows, the tilting base, the tilting mirror and the tilting and reversible light reflector, all being shown in full lines in one of their adjustments and in dotted lines in another of their adjustments, and Fig. 4 is a detail side view of the light reflector and a portion of its supporting frame, the reflector being shown in its reversed position from that shown in the other views.

The tilting base is denoted by 1; the tilting mirror by 2 and the tilting and reversible light reflector by 3.

A suitable frame for supporting the base, the mirror and the light reflector, is provided, which frame comprises a skeleton bottom 4, side posts 5 and cross bars 6 at the tops of said side posts.

The bottom 4 may be provided with casters 7 for more easily moving the appliance from place to place. Arms 8 project rearwardly and upwardly from the bottom 4 of the frame.

The base 1 which forms the support for the articles to be photographed is pivoted at 9 between the posts 5 adjacent to the bottom 4 of the frame. This base may be locked in its different tilting adjustments by any suitable means, such, for instance, as by providing the bottom 4 of the frame with a swinging loop bar 10 and the base 1 with a lock bolt 11 engaging said loop bar 10.

The mirror 2 is pivoted at 12 between the posts 5 of the frame at the desired distance above the tilting base 1.

The mirror 2 and the base 1 may be adjusted into the desired angular relationship to each other and locked in such relationship as the parts are tilted into their different adjustments. The means which I have shown for accomplishing this result comprises loop bars 13 pivoted at their lower ends to the sides of the base 1 and having their looped upper ends engaged by lock bolts 14 carried by the mirror 2.

The light reflector 3 is pivotally supported at 15 between the side arms 8 of the frame, which pivotal support is so arranged that the light reflector may be removed and reversed by loosening the clamp nuts 16. This light reflector is preferably a prism reflector so that the light may be reflected in right lines therefrom onto the articles to be photographed.

It is to be understood that the clamp nuts 16 may be used to lock the light reflector 3 in its different rotary and reversed positions.

Side curtains 17 are carried by the top cross bars 6 of the frame, which curtains may be raised and lowered at the sides of the appliance so as to produce the desired lighting effects upon the articles to be photographed.

The tilting of the base permits articles of various sizes to be arranged on the base 1 in such relationship that all of the objects may be brought into the proper focal plane.

The fixed angular relationship between the mirror and the base will permit the base to be tilted to different adjustments without changing the position of the camera lens. This appliance will also permit the ready photographing of articles in positions which it is almost impossible for them to be photographed where this appliance is not used, as, for instance, photographing a vase or a cup and saucer in top plan. Heretofore, the photographing of such articles in such a position necessitated the bringing of the support for the article into the picture and thus destroying the effect of the picture which it is desired to produce.

What I claim is:—

1. In a device of the character described, a base, a mirror located above the said base, and means for adjusting the angular relationship between the mirror and base.

2. In a device of the character described, a support, a base and a mirror both mounted thereon, the mirror being located above the base, and means for adjusting the angular relationship between the mirror and base.

3. In a device of the character described, a tilting base and a tilting mirror, and means for maintaining the mirror and base in a predetermined angular relationship to each other in their different adjustments.

4. In a device of the character described, a portable frame, a tilting base and a tilting mirror, both mounted thereon, and means for maintaining the mirror and base in a predetermined angular relationship to each other in their different adjustments.

5. In a device of the character described, a tilting base and a tilting mirror, and means for adjusting the angular relationship between the base and mirror and maintaining such angular relationship in their different adjustments.

6. In a device of the character described, a portable frame, a tilting base and a tilting mirror, both mounted thereon, and means for adjusting the angular relationship between the base and mirror and maintaining such angular relationship in their different adjustments.

7. In a device of the character described, a suitable support, a tilting base and a tilting mirror mounted thereon, means for locking the base to the support in its different adjustments and means for maintaining the angular relationship between the mirror and base in their different adjustments.

8. In a device of the character described, a portable frame, a tilting base and a tilting mirror mounted thereon, means for locking the base to the frame in its different adjustments and means for maintaining the angular relationship between the mirror and base in their different adjustments.

9. In a device of the character described, a suitable support, a tilting base and a tilting mirror, both mounted thereon, means for locking the base to the support in its different adjustments and means for adjusting the angular relationship between the mirror and base and maintaining them in such relationship in their different adjustments.

10. In a device of the character described, a portable frame, a tilting base and a tilting mirror, both mounted thereon, means for locking the base to the frame in its different adjustments and means for adjusting the angular relationship between the mirror and base and maintaining them in such relationship in their different adjustments.

11. In a device of the character described, a suitable support, a base, a mirror and a light reflector, all mounted thereon.

12. In a device of the character described, a portable frame, a base, a mirror and a light reflector, all mounted thereon.

13. In a device of the character described, a tilting base, a tilting mirror and a tilting light reflector.

14. In a device of the character described, a portable frame, a tilting base, a tilting mirror and a tilting light reflector, all mounted thereon.

15. In a device of the character described, a suitable support, a tilting base, a tilting mirror and a tilting light reflector, all mounted thereon, and means for maintaining the mirror and base in a predetermined angular relationship to each other in their different adjustments.

16. In a device of the character described, a portable frame, a tilting base, a tilting mirror and a tilting light reflector, all mounted thereon, and means for maintaining the mirror and base in a predetermined angular relationship to each other in their different adjustments.

17. In a device of the character described, a suitable support, a tilting base, a tilting mirror and a tilting reflector, all mounted thereon, and means for adjusting the base and mirror into a predetermined angular relationship with respect to each other and maintaining such relationship in their different adjustments.

18. In a device of the character described, a portable frame, a tilting base, a tilting mirror and a tilting reflector, all mounted thereon, and means for adjusting the base and mirror into a predetermined angular relationship with respect to each other and maintaining such relationship in their different adjustments.

19. In a device of the character described, a base, a mirror and a reversible prism light reflector.

20. In a device of the character described, a portable frame, a base, a mirror and a reversible prism light reflector, all mounted on said frame.

21. In a device of the character described, a suitable support, a base and a mirror, both mounted thereon, and side curtains carried by said support.

22. In a device of the character described, a portable frame, a base and a mirror, both mounted thereon, and side curtains carried by said frame.

23. In a device of the character described, a suitable support, a base, a mirror and a light reflector, all mounted thereon, and side curtains carried by the support.

24. In a device of the character described, a portable frame, a base, a mirror and a light reflector, all mounted thereon, and side curtains carried by the frame.

In testimony, that I claim the foregoing as my invention, I have signed my name in presence of two witnesses, this tenth day of September 1908.

GASSNER F. FRALEY.

Witnesses:
F. GEORGE BARRY,
OTTO W. HOLMGREN.